US010608919B2

(12) United States Patent
Beck et al.

(10) Patent No.: US 10,608,919 B2
(45) Date of Patent: Mar. 31, 2020

(54) PASSIVE INTERMODULATION (PIM) TESTING IN DISTRIBUTED BASE TRANSCEIVER STATION ARCHITECTURE

(71) Applicant: CommScope Technologies LLC, Hickory, NC (US)

(72) Inventors: Andrew E. Beck, Ashburn, VA (US); Thomas B. Gravely, Herndon, VA (US); Patrick Boyle, Centreville, VA (US)

(73) Assignee: CommScope Technologies LLC, Hickory, NC (US)

( * ) Notice: Subject to any disclaimer, the term of this patent is extended or adjusted under 35 U.S.C. 154(b) by 490 days.

(21) Appl. No.: 15/430,211

(22) Filed: Feb. 10, 2017

(65) Prior Publication Data

US 2017/0245162 A1    Aug. 24, 2017

Related U.S. Application Data

(60) Provisional application No. 62/297,392, filed on Feb. 19, 2016.

(51) Int. Cl.
*H04L 12/26* (2006.01)
*H04W 88/08* (2009.01)

(52) U.S. Cl.
CPC ........... *H04L 43/50* (2013.01); *H04W 88/085* (2013.01)

(58) Field of Classification Search
None
See application file for complete search history.

(56) References Cited

U.S. PATENT DOCUMENTS

| 6,304,594 B1 | 10/2001 | Salinger |
| 7,529,215 B2 | 5/2009 | Osterling |
| 7,555,669 B2 | 6/2009 | Wong et al. |

(Continued)

FOREIGN PATENT DOCUMENTS

| EP | 2381597 | 10/2011 |
| EP | 2521418 | 11/2012 |

(Continued)

OTHER PUBLICATIONS

CommScope, Inc., "Optical PIM Tester", Nov. 10, 2015, pp. 1-2.

(Continued)

*Primary Examiner* — Hassan A Phillips
*Assistant Examiner* — Gautam Sharma
(74) *Attorney, Agent, or Firm* — Fogg & Powers LLC (57) ABSTRACT

A passive intermodulation (PIM) tester is provided. The PIM tester includes at least one interface to couple the tester to a front-haul communication link used for communicating front-haul data to a remote radio head (RRH) having one or more antenna ports. The PIM tester includes a programmable processor, coupled to the interface, configured to execute software, wherein the software is operable to cause the tester to do the following: identify at least one tone in at least one downlink band of the remote radio head, wherein potential PIM products may appear in at least one uplink band of the remote radio head in response to the identified at least one tone; inject the identified at least one tone in the at least one downlink band of the remote radio head; and monitor the at least one uplink band for the potential PIM products from the injected at least one tone.

33 Claims, 4 Drawing Sheets

(56) References Cited

U.S. PATENT DOCUMENTS

| | | | |
|---|---|---|---|
| 7,571,338 B2 | 8/2009 | Osterling et al. | |
| 7,646,751 B2 | 1/2010 | Osterling et al. | |
| 7,680,149 B2 | 3/2010 | Liu et al. | |
| 7,751,393 B2 | 7/2010 | Chaskar et al. | |
| 7,937,110 B2 | 5/2011 | Wu et al. | |
| 8,005,152 B2 | 8/2011 | Wegener | |
| 8,018,910 B2 | 9/2011 | Jiang et al. | |
| 8,050,296 B2 | 11/2011 | Osterling | |
| 8,194,597 B2 | 6/2012 | Feder et al. | |
| 8,199,659 B2 | 6/2012 | Mergler et al. | |
| 8,204,144 B2 | 6/2012 | Takada et al. | |
| 8,346,091 B2 | 1/2013 | Kummetz et al. | |
| 8,363,741 B2 | 1/2013 | Patanapongpibul et al. | |
| 8,437,315 B2 | 5/2013 | Kostic et al. | |
| 8,903,324 B1 | 12/2014 | Bradley | |
| 9,014,052 B2 | 4/2015 | Gravely et al. | |
| 10,038,522 B1* | 7/2018 | Ju | H04L 1/244 |
| 2002/0094785 A1* | 7/2002 | Deats | H04B 1/1027 455/67.13 |
| 2003/0122534 A1 | 7/2003 | Seppinen et al. | |
| 2004/0037285 A1 | 2/2004 | Viero et al. | |
| 2005/0095986 A1 | 5/2005 | Hassan et al. | |
| 2005/0249221 A1 | 11/2005 | Remi et al. | |
| 2007/0171866 A1 | 7/2007 | Merz et al. | |
| 2008/0008122 A1 | 1/2008 | Yoon | |
| 2008/0011171 A1 | 1/2008 | Schneider et al. | |
| 2008/0013480 A1 | 1/2008 | Kapoor et al. | |
| 2008/0037435 A1 | 2/2008 | Sankala | |
| 2008/0102897 A1 | 5/2008 | Song et al. | |
| 2008/0144522 A1 | 6/2008 | Chang et al. | |
| 2008/0181171 A1 | 7/2008 | Koziy et al. | |
| 2009/0149221 A1 | 6/2009 | Liu et al. | |
| 2010/0022251 A1 | 1/2010 | Watanabe et al. | |
| 2010/0029282 A1 | 2/2010 | Stamoulis et al. | |
| 2010/0085061 A1* | 4/2010 | Bradley | H04B 17/0085 324/520 |
| 2010/0121897 A1 | 5/2010 | Bal et al. | |
| 2010/0329404 A1 | 12/2010 | Xiang et al. | |
| 2011/0032910 A1 | 2/2011 | Aarflot et al. | |
| 2011/0119550 A1 | 5/2011 | Fantaske | |
| 2011/0190005 A1 | 8/2011 | Cheon et al. | |
| 2011/0234336 A1* | 9/2011 | Hershtig | H01G 4/02 333/132 |
| 2011/0310810 A1 | 12/2011 | Kenington et al. | |
| 2012/0009948 A1 | 1/2012 | Powers et al. | |
| 2012/0057572 A1 | 3/2012 | Evans et al. | |
| 2012/0113972 A1 | 5/2012 | Lie et al. | |
| 2012/0236818 A1 | 9/2012 | Kaminski et al. | |
| 2012/0250740 A1 | 10/2012 | Ling | |
| 2013/0055286 A1 | 2/2013 | Griffioen | |
| 2013/0071112 A1 | 3/2013 | Melester et al. | |
| 2013/0100823 A1 | 4/2013 | Ren et al. | |
| 2013/0272170 A1 | 10/2013 | Chatterjee et al. | |
| 2014/0003314 A1* | 1/2014 | Shu | H04W 72/0446 370/311 |
| 2014/0049267 A1 | 2/2014 | Cordaro | |
| 2014/0119197 A1* | 5/2014 | Maca | H04B 17/0085 370/241 |
| 2014/0185601 A1 | 7/2014 | Ilyadis | |
| 2014/0198684 A1 | 7/2014 | Gravely et al. | |
| 2014/0369311 A1 | 12/2014 | Bi et al. | |
| 2014/0378047 A1 | 12/2014 | Kennard | |
| 2015/0023194 A1 | 1/2015 | Seo et al. | |
| 2015/0084782 A1 | 3/2015 | Zhang et al. | |
| 2015/0133111 A1 | 5/2015 | Bevan et al. | |
| 2015/0257165 A1* | 9/2015 | Gale | H04B 1/1036 370/329 |
| 2015/0271003 A1 | 9/2015 | Kuchi et al. | |
| 2016/0074005 A1* | 3/2016 | Corl | A61B 8/06 600/463 |
| 2016/0157115 A1 | 6/2016 | Kim et al. | |
| 2016/0352369 A1* | 12/2016 | Smith | H04B 1/1036 |
| 2016/0380668 A1* | 12/2016 | Aoki | H04B 1/525 370/278 |
| 2017/0214370 A1 | 7/2017 | Tseng et al. | |
| 2017/0245162 A1 | 8/2017 | Beck et al. | |
| 2017/0257833 A1 | 9/2017 | Hannan et al. | |
| 2018/0070254 A1 | 3/2018 | Hannan et al. | |
| 2018/0248576 A1 | 8/2018 | Coe et al. | |
| 2018/0337718 A1 | 11/2018 | Srinivasan | |

FOREIGN PATENT DOCUMENTS

| | | |
|---|---|---|
| WO | 2011072595 A1 | 6/2011 |
| WO | 2012062080 | 5/2012 |
| WO | 2012116007 | 8/2012 |
| WO | 2012171133 | 12/2012 |
| WO | 2015133952 | 9/2015 |
| WO | 2017072552 A1 | 5/2017 |
| WO | 2017151460 A1 | 9/2017 |

OTHER PUBLICATIONS

CommScope, Inc., "User Manual for Optical PIM Tester", Dec. 2015, pp. 1-49, Publisher: CommScope, Inc.

CommScope, Inc., "Optical PIM Tester", 2015, pp. 1-4, Publisher: CommScope, Inc.

Hannan, "Signal Power/Quality Measurement From Digital RF/IF Interface", "U.S. Appl. No. 15/249,027, filed Aug. 26, 2016", Aug. 26, 2016, pp. 1-31, Published in: US.

Hannan et al., "Signal Detection From Digital Interface", "U.S. Appl. No. 15/335,235, filed Oct. 26, 2016", Oct. 26, 2016, pp. 1-37, Published in: US.

Patent Cooperation Treaty, "Notification of Transmittal of the International Search Report and the Written Opinion of the International Searching Authority, or the Declaration, from PCT No. PCT/US2017019586, dated May 26, 2017", "from Foreign Counterpart of U.S. Appl. No. 15/335,235", filed May 26, 2017, pp. 1-15.

Gardner, "Exploitation of Spectral Redundancy in Cyclostationary Signals", IEEE Signal Processing Magazine, Apr. 1991, pp. 1-24, IEEE.

International Bureau, "International Preliminary Report on Patentability from PCT Application No. PCT/US2013/032030 dated Jul. 14, 2015", from Foreign Counterpart to U.S. Appl. No. 13/835,652, filed Jul. 14, 2015, pp. 1-8, Published: WO.

International Bureau, "International Preliminary Report on Patentability from PCT Application No. PCT/US2017/019586 dated Sep. 13, 2018", from Foreign Counterpart to U.S. Appl. No. 15/335,235, filed Sep. 13, 2018, pp. 1-12, Published: WO.

International Searching Authority, "International Search Report and Written Opinion from PCT Application No. PCT/US2016/068108 dated Apr. 7, 2017", from Foreign Counterpart to U.S. Appl. No. 15/777,737, filed Apr. 7, 2017, pp. 1-14, Published: WO.

U.S. Patent and Trademark Office, "Office Action", U.S. Appl. No. 15/491,914, dated Nov. 20, 2018, pp. 1-59, Published: US.

U.S. Patent and Trademark Office, "Restriction Requirement", U.S. Appl. No. 15/335,235, dated Nov. 29, 2018, pp. 1-6, Published: US.

U.S. Patent and Trademark Office, "Decision on Petition", U.S. Appl. No. 13/835,652, dated Mar. 15, 2016, pp. 1-2, Published: US.

European Patent Office, "Extended European Search Report from EP Application No. 13870842.5 dated Aug. 10, 2016", "from Foreign Counterpart of U.S. Appl. No. 13/835,652", filed Aug. 10, 2016, pp. 1-9, Published in: EP.

United States Patent and Trademark Office, "Notice of Allowance", "From U.S. Appl. No. 13/835,652", dated Dec. 19, 2014, pp. 1-7, Published in: US.

United States Patent and Trademark Office, "Office Action", "From U.S. Appl. No. 13/835,652", dated Aug. 20, 2014, pp. 1-7, Published in: US.

International Search Authority, "International Search Report and Written Opinion, from PCT Application No. PCT/US2013/032030, dated Oct. 18, 2013", "from Foreign Counterpart of U.S. Appl. No. 13/835,652", filed Oct. 18, 2013, pp. 1-8, Published in: WO.

Altera Corporation, "Implementing the CPRI Protocol Using the Deterministic Latency Transceiver PHY IP Core", "Altera Corporation", Jan. 2012, pp. 1-16, Published in: San Jose, CA.

(56) References Cited

OTHER PUBLICATIONS

Chun-Hui et al., "Research of CPRI Protocol Based on High-Speed Fiber Link", "2010 Second International Conference on Information Technology and Computer Science", 2010, pp. 336-339, Publisher: IEEE Computer Society.

Samardzija et al., "Compressed Transport of Baseband Signals in Radio Access Networks", "IEEE", Sep. 2012, pp. 3216-3225, vol. 11, No. 9, Publisher: IEEE Transactions on Wireless Communications.

Hannan et al., "Interference Detection and Identification in Wireless Network From RF or Digitized Signal", "U.S. Appl. No. 15/691,615", filed Aug. 30, 2017, pp. 1-42, Published in: US.

European Patent Office, "Summons to attend oral proceedings pursuant to Rule 115(1) from EP Application No. 13870842.5 dated Feb. 21, 2019", from Foreign Counterpart to U.S. Appl. No. 13/835,652, pp. 1-6, Published: EP.

U.S. Patent and Trademark Office, "Office Action", U.S. Appl. No. 15/335,235, dated Mar. 28, 2019, pp. 1-33, Published: US.

European Patent Office, "Communication Pursuant to Article 94(3) for EP Application No. 138708425.5", "Foreign Counterpart to U.S. Appl. No. 13/835,652", dated Jan. 29, 2018, pp. 1-5, Published in: EP.

Fugal, "Conceptual Wavelets in Digital Signal Processing: An In-Depth, Practical Approach for the Non-Mathematician", 2009, pp. 1-100, Publisher: Space & Signals Technical Publishing, Published in: San Diego, CA.

Gardner, "Cyclostationary in Communications and Signal Processing", "IEEE Communication Society", 1994, pp. 1-260, Publisher: IEEE.

U.S. Patent and Trademark Office, "Office Action", U.S. Appl. No. 15/491,914, dated Jun. 28, 2019, pp. 1-34, Published: US.

U.S. Patent and Trademark Office, "Office Action", U.S. Appl. No. 15/691,615, dated Jun. 12, 2019, pp. 1-39, Published: US.

Zhiqiang et al., "Exploration for the Calibration of Passive Intermodulation Analyzer", The Eighth International Conference on Electronic Measurement and Instruments (ICEMI), 2007, pp. 1-4.

U.S. Patent and Trademark Office, "Final Office Action", U.S. Appl. No. 15/335,235, dated Aug. 15, 2019, pp. 1-21, Published: US.

\* cited by examiner

PASSIVE INTERMODULATION (PIM) TESTING IN DISTRIBUTED BASE TRANSCEIVER STATION ARCHITECTURE

BACKGROUND

The traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data output from the BBU to radio frequency signals for radiating from one or more antennas coupled to the RRH and to produce baseband data for the BBU from radio frequency signals that are received at the RRH via one or more antennas.

The RRH is typically installed near the BTS antennas, often at the top of a tower, and the BBU is typically installed in a more accessible location, often at the bottom of the tower. The BBU and the RRH are typically connected through one or more fiber optic links. The interface between the BBU and the RRH is defined by front-haul communication link standards such as the Common Public Radio Interface (CPRI) family of specifications, the Open Base Station Architecture Initiative (OBSAI) family of specifications, and the Open Radio Interface (ORI) family of specifications.

Wireless operators are under constant pressure to increase the speed, capacity and quality of their networks while continuing to hold the line on cost. As technologies evolve, the challenge is becoming increasingly difficult. One specific reason: the escalating occurrence and cost of passive intermodulation (PIM).

Already recognized as a significant drain on network performance and profitability, the problem of PIM is intensifying. Advanced wireless equipment is becoming more sensitive, and new technologies like LTE are increasingly noise limited. It has been noted that a 1 Decibel drop in uplink sensitivity due to PIM can reduce coverage by as much as 11 percent.

Testing for PIM using conventional coaxial RF testing equipment is slow, costly and dangerous. Each sector, frequency and technology must be individually connected and tested. So, most operators resort to PIM testing only after detecting a significant rise in the noise floor or a drop in connection quality. Therefore, improvements in PIM testing are needed so that operators can afford to make PIM testing a regular part of their network acceptance and preventative maintenance programs thereby increasing the profitability of their network in an increasingly competitive marketplace.

SUMMARY

A passive intermodulation (PIM) tester is provided. The PIM tester includes at least one interface to couple the tester to a front-haul communication link used for communicating front-haul data to a remote radio head (RRH) having one or more antenna ports. The PIM tester includes a programmable processor, coupled to the interface, configured to execute software, wherein the software is operable to cause the tester to do the following: identify at least one tone in at least one downlink band of the remote radio head, wherein potential PIM products may appear in at least one uplink band of the remote radio head in response to the identified at least one tone; inject the identified at least one tone in the at least one downlink band of the remote radio head; and monitor the at least one uplink band for the potential PIM products from the injected at least one tone.

DETAILED DESCRIPTION

Embodiments of the present invention enable operators to proactively test for PIM rather than in the typical, reactionary procedure, that is common in the art. Embodiments of the present invention provide a PIM Tester that enables "truly active" PIM testing using the Common Public Radio Interface (CPRI) link between the BBU and the RRH by injecting signals into a base station's downlink and looking for PIM products in its uplink. Using an optical PIM tester constructed according to the teachings of the present invention, a single technician can now simultaneously test multiple frequencies, frequency bands and sectors from the ground in a fraction of the time it takes with legacy coaxial PIM test equipment. An Optical PIM Tester constructed according to the teachings of the present invention not only reduces testing time and service downtime, it replaces multiple conventional test units that are typically larger and more expensive to produce and maintain.

Distributed Base Station System

Figure 1:
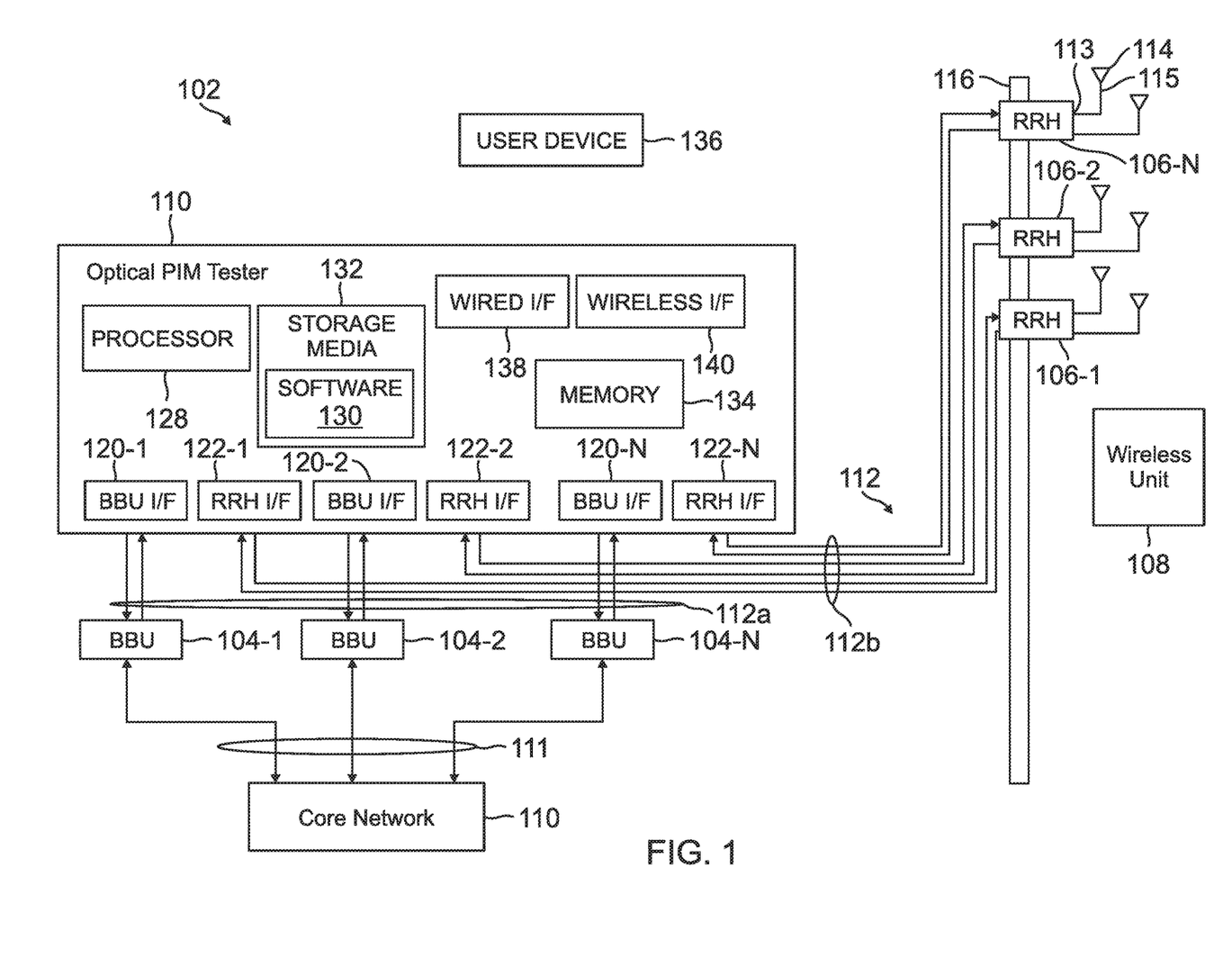
FIG. 1 is a block diagram of one exemplary embodiment of a passive intermodulation (PIM) tester for a distributed base station system with in which the techniques for testing for PIM products described here can be used.

FIG. 1 is a block diagram of one exemplary embodiment of a passive intermodulation (PIM) tester 100 for a distributed base station system, indicated generally at 102, with in which the techniques for testing for PIM products described here can be used.

In the exemplary embodiment shown in FIG. 1, the system 102 comprises a plurality of baseband units (BBU) 104-1 to 104-N and a plurality of remote radio heads (RRH) 106-1 to 106-N that communicate over a plurality of wireless radio frequency (RF) channels with one or more wireless units 108 (such as mobile telephones, smartphones, tablets, wireless modems for laptops or other computers or for other devices such as wireless sensors or other "Internet of Things" (IOT) or machine-to-machine (M2M) devices) using one or more standard wireless air interfaces. The exemplary embodiment of system 102 shown in FIG. 1 may support several air interfaces, e.g., three air interfaces including, but not limited to, Long-Term Evolution (LTE) 4G air interface described in the "Third Generation Partnership Project (3GPP) Technical Specification (TS) 36.211 Evolved Universal Terrestrial Radio Access (E-UTRA); Physical Channels and Modulation" specification produced by the 3GPP, Advanced Wireless Services (AWS-1), Personal Communications Services (PCS), CLR, GSM, WiMax, and others. It is to be understood that other air interfaces can be used.

Each BBU 104 is communicatively coupled to the core network 110 of a wireless service provider using a suitable bi-directional backhaul communication link 111 and interface (for example, using a wireless or wired ETHERNET connection and using the LTE S1 interface). The backhaul communication link 111 can also be used for base station-to-base station communications using the LTE X2 interface.

Each BBU 104 is communicatively coupled to a corresponding RRH 106 using a bi-directional front-haul communication link 112. In the exemplary embodiment shown in FIG. 1, the bi-directional front-haul communication link 112 is implemented using a plurality of pairs of optical fibers, where, in each pair, one optical fiber is used for downlink communications from the BBU 104 to the RRH 106 and the other optical fiber is used for uplink communications from the RRH 106 to the BBU 104. Further, as shown in FIG. 1, the plurality of optical fibers 112 are split into two parts; a first part 112a connecting BBU 104 to optical PIM tester 100 and a second part 112b connecting optical PIM tester 100 to a respective RRH 106. It is to be understood that the front-haul communication link 112 can be implemented in other ways. The exemplary embodiment shown in FIG. 1 is described here as using a CPRI interface for communications between each BBU 104 and the corresponding RRH 106 over the front-haul communication link 112. It is to be understood, however, that a different front-haul interface could be used (for example, the OBSAI or ORI interface).

As noted above, each BBU 104 performs baseband processing for the particular air interface that is being used to wirelessly communicate over its assigned RF channel, and the RRH 106 performs radio frequency processing to convert baseband data output from the BBU 104 to radio frequency signals for radiating from one or more antennas 114 that are connected to the RRH 106 at antenna port 113 via coaxial cable 115 and to produce baseband data for the associated BBU 104 from radio frequency signals that are received at the RRH 106 via one or more antennas 114.

During normal operation of the system 102, in the downlink direction, the BBUs 104 generate downlink baseband IQ data to encode frames of downlink user and control information received from the core network for communication to the wireless units 108 over the appropriate wireless RF channels. The downlink baseband IQ data is communicated from the BBUs 104 to the RRHs 106 over the respective front-haul communication link 112. The RRHs 106 receive the downlink baseband IQ data and generate one or more downlink analog radio frequency signals that are radiated from the one or more antennas 114 for reception by the wireless units 108. The wireless units 108 perform baseband processing, in accordance with the air interface, on the received downlink analog RF downlink signals in order to recover the frames of downlink user and control information.

During normal operation of the system 102, in the uplink direction, the wireless units 108 generate, in accordance with the air interface, uplink analog radio frequency signals that encode uplink user and control information that is to be communicated to the core network 110 and transmits the generated uplink analog RF signals over the wireless RF channel. The uplink analog RF signals are received by one or more antennas 114 connected to the RRHs 106. The RRH 106 that receives the uplink analog RF signal produces uplink baseband IQ data from the received uplink analog RF signals. The uplink baseband IQ data is communicated from the RRH 106 to the associated BBU 104 over the front-haul communication link 112. The BBU 104 receives the uplink baseband IQ data and performs baseband processing, in accordance with the air interface, on the uplink baseband IQ data in order to recover the uplink user and control information transmitted from the wireless units 108. The BBU 104 communicates the recovered uplink user and control information to the core network 110 over the backhaul communication link 111 using the backhaul interface.

The RRHs 106 are typically installed remotely from its corresponding BBU 104, near the antennas 114 and is mounted to a structure 116 (such as a tower, pole, building, tree, or other structure). For example, the RRH 104 can be mounted near the top of the structure 116 and the BBU 104 can be located on the ground, where the optical fibers used to implement the front-haul communication link 112 run up the structure 116 to couple the BBU 104 to the RRU 106. Although FIG. 1 shows the RRH 106 mounted near the top of structure 116, the RRH 106 can be mounted at other positions relative to the structure 116, for example, approximately midway between the bottom and top of the structure 116.

Passive Intermodulation (PIM) Tester

Passive intermodulation tester 100 can be coupled to the font-haul communication link 112 in order to capture downlink and uplink frames of data communicated between the plurality of BBUs 104 and the respective plurality of RRHs 106 while the plurality of BBUs 104 and the plurality of RRHs 106 are operating normally. Also, the PIM tester 100 can inject a test signal, e.g., baseband IQ data (e.g. carrier wave (CW) tones or a modulated signal), into the frames of data communicated over the front-haul communication link 112.

In the exemplary embodiment shown in FIG. 1, the PIM Tester 100 calculates and injects tones into the downlink baseband IQ data on front-haul communication link 112 to detect PIM products in any uplink channels of system 102. It is to be understood, however, that the PIM Tester 100 can be implemented in test equipment that provides other functionality as well. For example, the PIM Tester 100 can be implemented test equipment that includes other functions such as an optical spectrum analyzer, interference detector, and/or signal quality management system. Moreover, one or more of these functions (for example, PIM testing, spectrum analyzer, interference detecting, and signal quality management) can be combined into a single unit. For example, the optical PIM tester 100 described below can also include one or more of spectrum analyzer, interference detection, and/or signal quality management functions, in addition to PIM testing functions.

Passive Intermodulation (PIM) occurs when two or more high power RF signals encounter PIM sources or materials in an RF path. These PIM sources behave like a mixer causing new signals to be generated at mathematical combinations of the original RF inputs. When these PIM signals fall in the receive frequency band of the system 102, the resulting interference causes increased dropped calls, reduced data transmission rates, and/or decreased system capacity.

The primary PIM sources in the system 102 shown in FIG. 1 are inconsistent metal to metal contacts in high current density regions such as at the antenna ports 113, in the coaxial cable 115, at the connectors connecting the coaxial cable 115 to the antenna 114 or the antenna port 113, or in the antenna 114. Additionally, PIM sources external to the system 102 may also cause PIM products in the uplink of system 102. Optical PIM Tester 100 may detect PIM products caused by both sources that are internal and external to system 102.

PIM testing involves outputting two or more high power test RF signals on each antenna port 113 associated with a selected RF channel. If the test signals encounter a non-linear junction (for example, at the antenna port 113, in the coaxial cable 115, at the connectors connecting the coaxial cable 115 to the antenna 114 or the antenna port 113, or in the antenna 114) or other PIM source, mixing occurs causing the PIM frequencies (also referred to as PIM products) to be generated. The PIM products travel in all directions from the point of generation. This means they travel in both the downlink and uplink direction. The PIM signals travelling in the uplink direction can be received and analyzed by the optical PIM tester 100.

However, connecting PIM test equipment directly to the antenna ports 113 of the RRH 106 is typically inconvenient, especially when the RRH 106 is mounted near the top of a tower or other structure 116.

To avoid having to do this, the optical PIM tester 100 is conveniently coupled to the front-haul communication link 112 near the BBUs 104. This is typically at the base of structure 116 and is thus easily accessible to a technician for running the PIM tests.

In the exemplary embodiment shown in FIG. 1, the optical PIM tester 100 is coupled to the front-haul communication link 112 by connecting the optical PIM tester 100 in-line with the plurality of BBUs 104 and the plurality of RRHs 106. The optical PIM tester 100, in this exemplary embodiment, includes two bi-directional optical interfaces 120, 122 for each RF band supported by the system 102. For each BBU 104, a BBU optical interface 120 provides a connection between optical PIM tester 100 and the associated BBU 104. Additionally, a RRH optical interface 122 provides a connection between the optical PIM tester and the associated RRH 106. Each optical interface 120 and 122 comprises a pair of optical connectors (for example, a pair of LC optical connectors) and an optical transceiver for sending optical signals over one of the optical fibers 112 and for receiving optical signals from another of the optical fibers 112. In one implementation, each optical interface 120 and 122 is implemented using a small form-factor pluggable (SFP) modular optical transceiver that includes integrated optical LC connectors.

Each of the optical interfaces 120 and 122 also includes a respective physical layer device (PHY). In the exemplary embodiment shown in FIG. 1, where a CPRI interface is established over the front-haul communication link 112, the physical layer devices comprise CPRI physical layer devices.

The pair of optical fibers 112*b* that is connected to one of the plurality of RRUs 106 at one end and that normally would be connected to a corresponding BBU 104 at the other end is instead disconnected from the corresponding BBU 104 and connected to the corresponding RRH optical interface 122 of the optical PIM tester 100. One end of another pair of optical fibers 112*a* is connected to the corresponding BBU 104, where the other end of that second pair of optical fibers 112*a* is connected to the corresponding BBU optical interface 120. It is to be understood, however, that the optical PIM tester 100 can be coupled to the front-haul communication link 112 in other ways (for example, using passive optical couplers).

In the exemplary embodiment shown in FIG. 1, the optical PIM tester 100 further comprises one or more programmable processors 128 for executing software 130.

The software 130 comprises program instructions that are stored (or otherwise embodied) on or in an appropriate non-transitory storage medium or media 132 (such as flash or other non-volatile memory, magnetic disc drives, and/or optical disc drives) from which at least a portion of the program instructions are read by the programmable processor 128 for execution thereby. Although the storage media 132 is shown in FIG. 1 as being included in, and local to, the optical PIM tester 100, it is to be understood that remote storage media (for example, storage media that is accessible over a network) and/or removable media can also be used. The optical PIM tester 100 also includes memory 134 for storing the program instructions (and any related data) during execution by the programmable processor 128. Memory 134 comprises, in one implementation, any suitable form of random access memory (RAM) now known or later developed, such as dynamic random access memory (DRAM). In other embodiments, other types of memory are used. Functionality described here as being implemented in software 130 can be implemented in other ways (for example, using an application specific integrated circuit (ASIC) or field programmable gate array (FPGA)).

The software 130 executing on the programmable processor 128 sends and receives frames of user plane and control plane information with the physical layer devices included in the optical interfaces 120 and 122. For example, the software 130 is configured to capture downlink frames in order to determine system information that the BBU 104 and the RRU 106 are using for communicating with each other and with the wireless units 108 over the wireless RF channel (for example, information identifying what RF frequency channels are being used to communicate over the RF frequency channel).

In this exemplary embodiment, the optical PIM tester 100 can be operated in a PIM test mode. In this mode, downlink CPRI frames are transmitted by the BBU 104 on the front-haul communication link 112*a*. The optical signals are received at the BBU optical interface 120, which converts the received optical signal to an electrical signal that is provided to the CPRI PHY included in the BBU optical interface 120. The CPRI PHY extracts the downlink CPRI frames from the received signals and communicates the downlink CPRI frames to the programmable processor 128 for processing by the software 130. The software 130 is configured to insert digital baseband IQ data for the PIM test signals into a desired antenna container (AxC) included in the downlink CPRI frames. That is, the baseband IQ data that the BBU 104 originally included in that AxC is replaced with the baseband IQ data for the PIM test signals. The software 130 forwards the modified downlink CPRI frames to the CPRI PHY in the RRH optical interface 122 for transmitting the modified downlink CPRI frames to the RRU 106 over the downlink fiber included in the front-haul communication link 112*b*. The RRU 104 extracts the digital baseband IQ data for that AxC and then generates an analog RF signal (tones) that comprises the PIM test signals and outputs the PIM test signals on the relevant antenna port 113.

Any PIM signals generated due to PIM sources (for example, at the antenna port 113, in the coaxial cable 115, at the connector connecting the coaxial cable 115 to the antenna 114 or the antenna port 113, or in the antenna 114) will show up in the uplink signals received on the antenna ports 113 of the RRH 106 and will be reflected in the uplink digital baseband IQ data transmitted by the RRH 106 in uplink CPRI frames to the associated BBU 104 via the front-haul communication link 112.

The uplink CPRI frames transmitted from the RRH 106 on the front-haul communication link 112b are captured by the optical PIM tester 100 and checked for PIM products. That is, uplink CPRI frames transmitted by the RRH 106 on the front-haul communication link 112b. The optical signals are received at the RRH optical interface 122, which converts the received optical signal to an electrical signal that is provided to the CPRI PHY included in the RRH optical interface 122. The CPRI PHY extracts the uplink CPRI frames from the received signals and communicates the uplink CPRI frames to the programmable processor 128 for processing by the software 130. The software 130 is configured to extract the uplink baseband IQ data from the AxCs included in the uplink CPRI frames and process that baseband IQ data in order to identify and characterize any PIM that may occur in the uplink in response to injecting the PIM test signals.

A user can interact with the software 130 executing on the optical PIM tester 100 using a user device 136, e.g., smartphone, tablet, or computer. The user device 136 is communicatively coupled to the optical PIM tester 100. In the exemplary embodiment shown in FIG. 1, the optical PIM tester 100 includes one or more wired interfaces 138 (for example, an ETHERNET interface and/or a USB interface) and wireless interfaces 140 (for example, a Wi-Fi wireless interface) to communicatively couple the optical PIM tester 100 to a local area network or directly to the user device 136. Moreover, a remotely located user device 136 can access the optical PIM tester 100 via a connection established over the local area network and/or a public network such as the Internet. In one embodiment, the software 130 implements a webserver that is operable to present a browser-based user interface that enables a user to use a general-purpose Internet browser installed on the user device 136 to interact with the software 130 on the optical PIM tester 100.

Although optical PIM tester 100 is described as implementing a technique to test for passive intermodulation products, the baseband IQ data association techniques described above can be used with other similar systems and devices that intercept baseband IQ data that is communicated over a front haul communication link between a BBU and RRU including, for example, optical spectrum analyzers, interference detectors and/or signal quality management systems. Moreover, one or more of these functions (for example, PIM testing, spectrum analyzer, interference detecting, and signal quality management) can be combined into a single unit.

Also, although the embodiments described above are described as using antenna carriers in downlink CPRI frames, it is to be understood that the techniques described here can be used with other streams of baseband IQ data (for example, streams of baseband IQ data communicated over an OBSAI or ORI interface).

Process for Passive Intermodulation Testing

Figure 2:
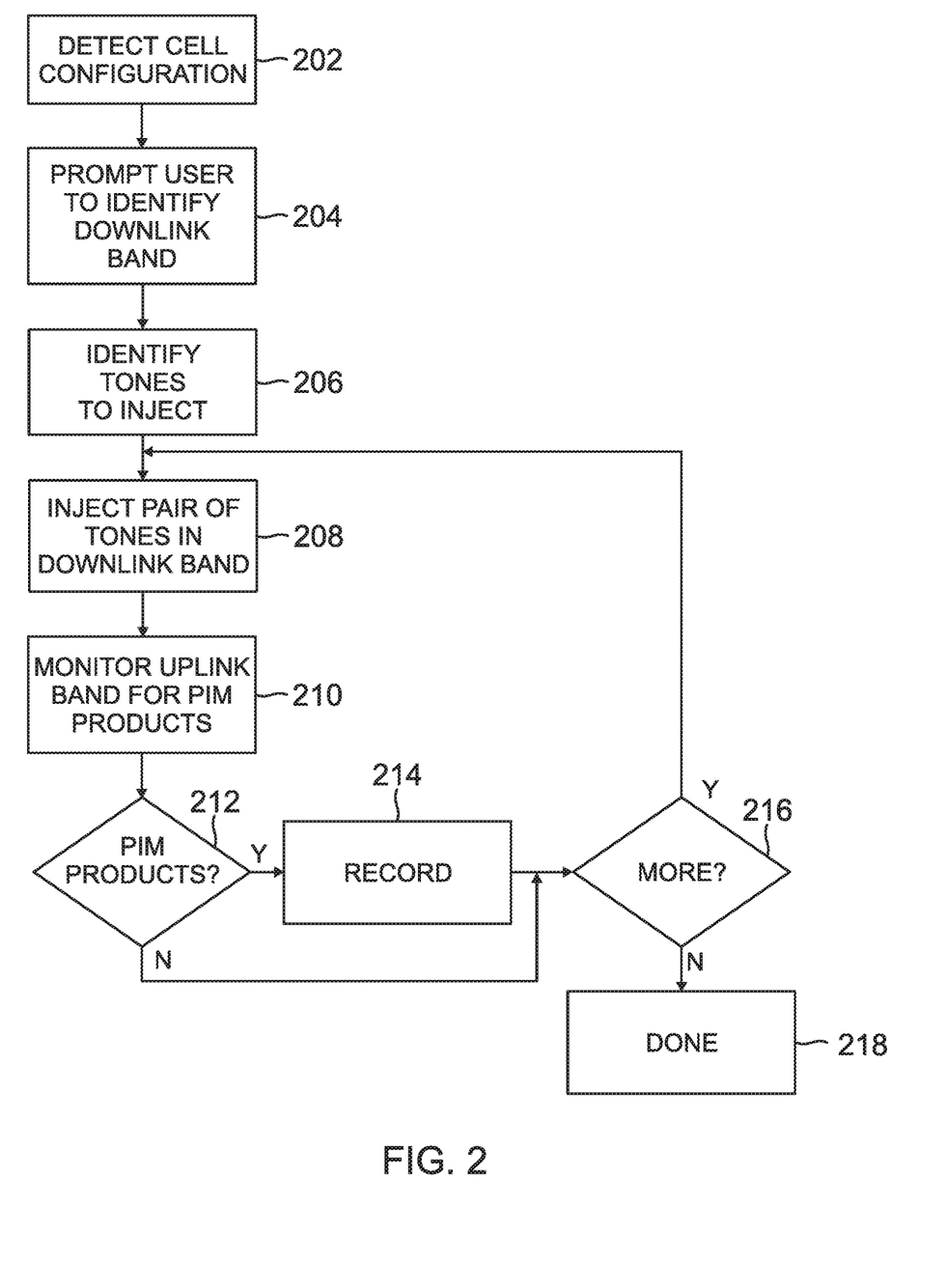
FIG. 2 is a flow diagram of one exemplary embodiment of a method of testing for PIM products in a distributed base station.

FIG. 2 is a flow diagram of one exemplary embodiment of a method of testing for PIM products in a distributed base station, such as system 100 of FIG. 1. The process may be used to test for PIM products on a single cell or band. Alternatively, the process can also be applied, in other embodiments, for cross-band PIM testing in which test signals from one or more bands combine to produce PIM products in any of the uplink bands of the distributed base station, such as system 100 of FIG. 1. Advantageously, the process of FIG. 2 can perform cross-band PIM testing using the system of FIG. 1 without the need for complex synchronization techniques because the PIM tester 100 generates all test signals in a unified platform for all bands.

The process of PIM testing begins by gathering information to establish the parameters of the PIM testing. First, at block 202, the process detects the cell configuration for the distributed base station to determine the types of cells to be tested, e.g., LTE, WCDMA, etc. To do this, a technician connects the optical PIM tester 100 into the front-haul communication link 112 between at least one BBU 104 and a corresponding RRH 106. Processor 128 executes program instructions from software 130 to detect the CPRI parameter configuration and extract the cell ID from the baseband IQ data transported over the front-haul communication link 112 for each cell to be tested, e.g., as described in U.S. Pat. No. 9,014,052. The process next prompts the user to identify the downlink band that is used for each detected cell at block 204. In one embodiment, processor 128 executes program code to present a list of possible downlink bands to the user at user device 136 through either the wired or wireless interfaces 138 and 140, respectively. Alternatively, the downlink bands may also be detected by PIM tester 100.

Once the downlink bands to be tested are known, the process proceeds to identify one or more tones to be injected in the downlink bands to test for PIM products at block 206. Example processes for selecting the test tones are described below with respect to FIGS. 3 and 4. In general, the process pairs each frequency or tone in the downlink band with each other frequency or tone in the downlink band. The process then calculates the potential PIM products (e.g., $2^{nd}$ order, $3^{rd}$ order, $4^{th}$ order, $5^{th}$ order, $7^{th}$ order, $9^{th}$ order, etc.) for each pair of tones and determines which, if any, of these potential PIM products fall within an uplink band of the system.

In one embodiment, the process tests for PIM products in the distributed base station by injecting the identified tone pairs in the downlink band, at block 208, and then monitoring the uplink band for the potential PIM products at block 210. In one embodiment, the process tunes a narrowband receiver to a frequency of the potential PIM product. Then the process applies a Fast Fourier Transform (FFT) to the data from the narrowband receiver. At block 212, the process determines whether there are PIM products at the expected frequency. For example, the process compares the magnitude of the signal from the FFT against a specified threshold. If the signal exceeds the threshold, the process records the existence of a PIM product in that band at block 214. In another embodiment, the process averages the value of the signal over a period of time or runs the test multiple times before declaring the presence of a PIM product to make the process less likely to falsely identify user traffic as a PIM product. PIM products typically are more persistent while user traffic is generally more dynamic. Thus, testing for PIM products over a time window (including running the same test tones multiple times) can reduce the likelihood of a false positive PIM indication due to the presence of non-PIM signals at or near the same frequency.

In another embodiment, the tones injected at block 208 are modulated with a selected modulation scheme. For example, the tones may be modulated with a simple on-off pattern. If PIM products result from the injected tones, the PIM products will also exhibit the same modulation. Thus, at block 210, when monitoring for PIM products, the process looks for signals at the designated uplink frequencies that exhibit the same modulation, e.g., an on-off pattern. Alternatively, in other embodiments, a higher order modulation scheme, such as phase or frequency modulation, is used. With the use of such modulation, it may be possible to detect PIM products with lower signal-to-noise ratio due to some gain in the demodulation of the PIM products.

In other embodiments, it is desirable to conduct cross-band testing to detect PIM products in systems in which only one of the bands of the system uses a front-haul communication link that that can be tapped into by the optical PIM tester 100, e.g., the system uses a CPRI interface between the BBU 104 and the RRH 106. For example, the system has an LTE band with, for example, a CPRI interface and a CDMA band that does not have a CPRI interface. In this instance, the process injects a tone in the baseband IQ data of the downlink LTE channel at block 208. This injected tone is advantageously modulated, e.g., with on-off, phase or frequency modulation. Alternatively, the process injects a signal with a known cyclostationary signature (a signal that has a statistical property that varies cyclically with time). At block 210, the process monitors the uplink band to detect for PIM products. To do this, the process monitors the uplink band to determine if the noise floor exhibits the same modulation as the injected tone. For example, if the tone is injected with on-off modulation, then PIM products are detected if the noise in the uplink band also exhibits this characteristic.

At block 216, the process determines whether additional pairs of test tones need to be applied to the downlink bands. If not the process ends at block 218. If additional pairs of tones are available to test, the process returns to block 208 and injects the tones in the appropriate downlink bands.

Identifying Potential PIM Products

Figure 3:
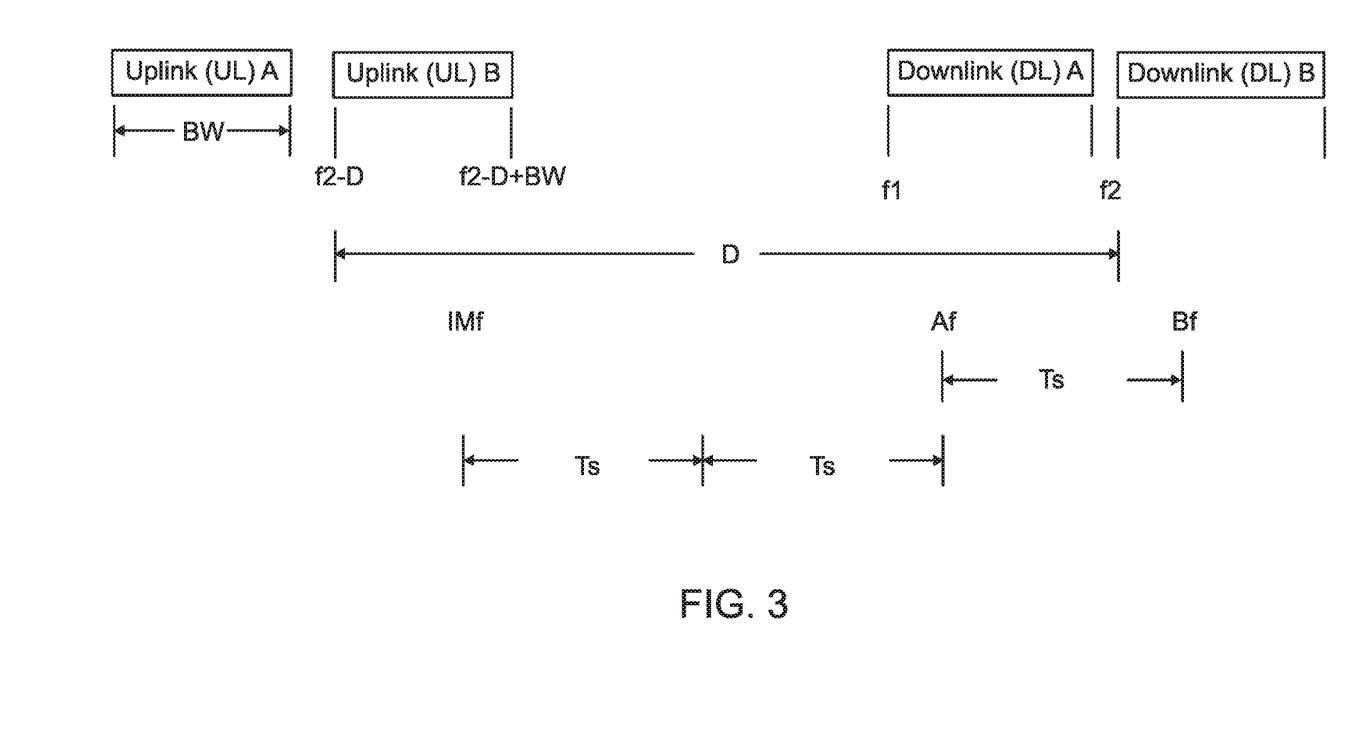
FIG. 3 is a spectrum diagram that illustrates an example of calculations that can be used to identify the location of potential PIM products in a distributed base station having two downlink channels or bands.

FIG. 3 is a spectrum diagram that illustrates an example of calculations that can be used to identify the location of potential PIM products in a distributed base station having two downlink channels according to one embodiment of the present invention. In this example, a base station optical link has been configured with two pairs of downlink (DL A and DL B) and uplink (UL A and UL B) channels. Downlink channel DL A is located at starting frequency and downlink channel DL B is located at starting frequency f2. Each channel (UL and DL) in this example has a bandwidth (BW) of, for example, 5, 10, 15, or 20 MHz. Further, the duplex spacing for the downlink and uplink channels is labelled D in FIG. 3. Although the uplink channel is shown at a lower frequency than the upstream channel, it is noted that the opposite configuration could also be used with the uplink channel at a higher frequency than the downlink channel.

The objective of this analysis is to identify pairs of frequencies in the downlink band(s) that have the potential to produce the lowest order PIM products in one or more of the uplink bands when, for example, tones or modulated signals are injected at one or more of the identified frequency pairs. In FIG. 3, example frequencies are labeled Af and Bf in the two downlink channels and they have the potential to produce the lowest order PIM product (and correspondingly, potentially the highest power PIM product) in the B uplink channel. As indicated, Af and Bf are separated by a tone separation of Ts where: Ts=Bf−Af. IMf, the potential PIM product frequency, will always be some multiple (M) of Ts below Af (or above Bf when the uplink channels are at a higher frequency than the downlink channels). As illustrated, IMf is two multiples of Ts below Af. The value of the frequency, IMf, is given by IMf=Af−M*Ts where in this case M is 2. The IM order for this potential PIM product is 2*M+1. In the example, IM is 5.

It is noted that this application is not limited to this formula for calculating PIM products, nor is the application limited to these orders of potential PIM products. For example, other possible formulas include 2f2 or f2−f1 (both second order PIM products) and 3f2−f1 or 2f2−2f1, both for fourth order PIM products and 4f2−f1 for fifth order PIM products, by way of illustration and not by way of limitation. Any appropriate formula for calculating PIM products can also be used and the teachings of the present invention is not limited to any particular technique or formula for calculating PIM products.

There may be multiple PIM products calculated for a given set of BW, D, f1 and f2. The process selects the lowest order IM possible with values of Af, Bf and IMf. Further, the process also favors selecting frequencies Af and Bf that are away from the edges of the downlink channel to eliminate the effects of the filters of the channel on the selection of frequencies to be used for PIM testing.

One method to find the appropriate values for Af and Bf is to step through the possible values (using a reasonable step value like 0.1 MHz) starting with the lowest IM value ($2^{nd}$ order) and calculate IMf. Then, the process validates that the calculated value of IMf falls within the appropriate section of the UL channel (not near the edges and not near the center) and stops when an appropriate test frequency has been identified. If an appropriate test frequency was not identified at the current IM multiple, the IM multiple is increased to the next ($3^{rd}$ order) and the test of the Af and Bf frequencies is repeated. The process is further repeated for IM orders such as $4^{th}$, $5^{th}$, $7^{th}$, $9^{th}$, $11^{th}$, $13^{th}$ and $15^{th}$ orders, if necessary.

It is noted that the description of FIG. 3 relates to cross-band PIM testing in that the tones or frequencies used to calculate the potential PIM products originate in different downlink bands. The same process described above can be used when selecting two tones or frequencies in the same downlink band. Further, in this embodiment, the process looks for PIM products in uplink band(s) that are directly related to (paired with) the downlink bands. In other embodiments, the process may look for PIM products in one or more uplink bands not directly associated with the downlink band(s).

Figure 4:
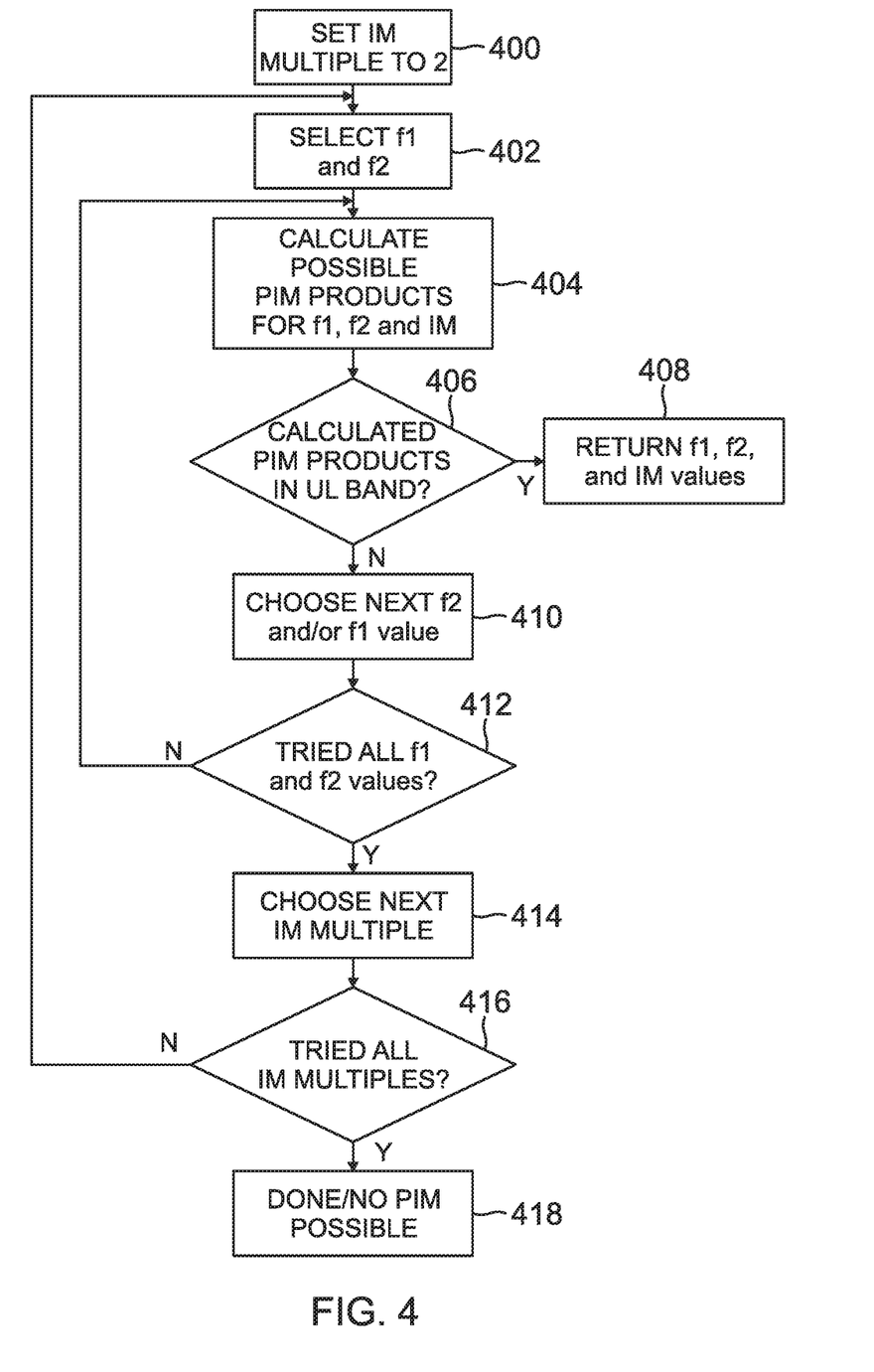
FIG. 4 is a flow diagram of one exemplary embodiment of a method for identifying pairs of tones to be used for PIM testing in a distributed base station.

FIG. 4 is a flow diagram of another exemplary embodiment of a method for identifying pairs of tones to be used for PIM testing in a distributed base station. As mentioned above with respect to FIG. 3, one process to find appropriate test tones for locating potential PIM products is to step through the possible combinations of frequencies in the downlink channel or channels. By stepping through the possible combinations, a list of pairs of test tones is produced that is a subset of the possible pairs of tones in the downlink bands. FIG. 4 is a flow diagram that illustrates such an embodiment.

The process of FIG. 4 begins at block 400 by setting the IM multiple to 2. At block 402, the process selects an initial pair of frequencies or tones (e.g., carrier wave or modulated signal). In one embodiment, the selected tones are selected in the same downlink band. In other embodiments, the tones are selected from different downlink bands to check for cross-band PIM products. In one embodiment, the tones are selected based on a step value of, for example, 0.1 MHz, although other step values can be chosen for a given implementation.

With the first pair of tones selected, the process moves on to considering potential PIM products associated with the pair of tones. At block 404, the process calculates the potential PIM product(s) for the current IM multiple. At block 406, the process determines if any of the PIM product(s) fall within an uplink band for the distributed base station under test. If so, the process returns the pair of tones at block 408 and notes the order (IM value) of the potential PIM product.

If none of the PIM product(s) fall within the uplink band, the possible values for the pair of frequencies are iterated through at blocks 410 and 412 until all values of f1 and f2 have been tried for the current order of PIM products and their corresponding PIM product(s) are tested against the uplink band. The IM multiple value is increased at block 414 and the process repeats until, at block 416, the process determines that all IM multiples are tried or until a valid PIM product is found at block 406.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

Example Embodiments

Example 1 includes a method of testing for passive intermodulation (PIM) for a base station, the method comprising: detecting cell configuration data for at least one cell of the base station; prompting a user to identify at least one downlink band for at least one detected cell; identifying tones in the at least one downlink band for the at least one detected cell, wherein potential PIM products may appear in at least one uplink band of the base station in response to the identified tones; injecting the identified tones in the at least one downlink band of the base station; monitoring the at least one uplink band for the potential PIM products from the injected tones; and recording the existence of the potential PIM products when detected.

Example 2 includes the method of Example 1, wherein detecting cell configuration data comprises detecting a cell ID from baseband data transmitted on an optical link between a baseband unit (BBU) and a remote radio head (RRH).

Example 3 includes the method of Example 2, wherein the baseband data is transmitted using one of a CPRI interface, an OBSAI interface, and an ORI interface.

Example 4 includes the method of any of Examples 1-3, wherein prompting the user to identify at least one downlink band comprises prompting the user for an RF channel number.

Example 5 includes the method of Example 4, wherein prompting the user further comprises presenting a list of downlink bands associated with a detected cell ID.

Example 6 includes the method of any of Examples 1-5, wherein identifying tones in the at least one downlink band includes: calculating the potential PIM products using a plurality of pairs of tones in the at least one downlink band identified by the user; and identifying a subset of the pairs of tones to be injected in the at least one downlink band to test for the potential PIM products in the unlink band.

Example 7 includes the method of Example 6, wherein identifying a subset of pairs of tones includes identifying a pair of tones that produces a lowest order PIM product that falls within the uplink band.

Example 8 includes the method of any of Examples 1-7, wherein identifying tones comprises selecting pairs of tones in the same downlink band.

Example 9 includes the method of any of Examples 1-8, wherein identifying tones comprises pairing each tone in a plurality of downlink bands with the other tones in the plurality of downlink bands and calculating potential PIM products based on each pair of tones.

Example 10 includes the method of Example 9, wherein identifying tones further comprises determining whether the calculated, potential PIM products fall in any of the at least one uplink bands of the base station.

Example 11 includes the method of any of Examples 1-10, wherein injecting the tones comprises injecting a first tone on one downlink band and a second tone on a second downlink band.

Example 12 includes the method of any of Examples 1-11, wherein monitoring the at least one uplink band for the potential PIM products comprises: tuning a narrowband receiver around a frequency of the potential PIM product; applying a Fast Fourier Transform (FFT) to the data from the narrowband receiver; and checking for a signal magnitude above a selected threshold.

Example 13 includes the method of Example 12, and further including averaging the output of the FFT over time.

Example 14 includes the method of any of Examples 1-13, and further repeating the process of injecting the identified tones and monitoring the at least one uplink band a plurality of times before recording the existence of the potential PIM products.

Example 15 includes the method of any of Examples 1-14, wherein injecting the identified tones comprises injecting one of carrier wave tones, modulated tones, or a signal with a cyclostationary signature.

Example 16 includes the method of Example1, wherein injected tones are modulated with one of on-off, phase or frequency modulation.

Example 17 includes the method of any of Examples 1-16, wherein monitoring the at least one uplink band for PIM products comprises monitoring an uplink channel that is paired with at least one of the at least one downlink band.

Example 18 includes a passive intermodulation tester, comprising: at least one interface to communicatively couple the tester unit to a front-haul communication link used for communicating front-haul data to a remote radio head (RRH) having one or more antenna ports; a programmable processor, coupled to the interface, configured to execute software, wherein the software is operable to cause the tester to do the following: identify at least one tone in at least one downlink band of the remote radio head, wherein potential PIM products may appear in at least one uplink band of the remote radio head in response to the identified at least one tone; inject the identified at least one tone in the at least one downlink band of the remote radio head; monitor the at least one uplink band for the potential PIM products from the injected at least one tone; and record the existence of the potential PIM products when detected.

Example 19 includes the tester of Example 18, wherein the at least one interface and programmable processor are implemented on a circuit board that is adapted for insertion into an RF test system.

Example 20 includes the tester of Example 19, wherein the at least one interface is adapted to use optic equipment in the RF test system to communicate over the front-haul communication link.

Example 21 includes the tester of any of Example 18-20, wherein identifying at least one tone comprises identifying pairs of tones in the at least one downlink band including: calculating the potential PIM products using the pairs of tones; and identifying a subset of the pairs of tones to be injected in the at least one downlink band to test for the potential PIM products in the at least one unlink band.

Example 22 includes the tester of Example 21, wherein identifying a subset of the pairs of tones includes selecting a pair of tones that produces a lowest order PIM product for the uplink band.

Example 23 includes the tester of any of Examples 18-22, wherein identifying at least one tone comprises pairing each tone in a plurality of downlink bands with the other tones in the plurality of downlink bands and calculating potential PIM products based on each pair of tones.

Example 24 includes the tester of Example 23, wherein identifying at least one tone further comprises determining whether the calculated, potential PIM products fall in any of the at least one uplink bands.

Example 25 includes the tester of any of Examples 18-24, wherein injecting the at least one tone comprises injecting a first tone on one downlink band and a second tone on a second downlink band.

Example 26 includes the tester of any of Examples 18-25, wherein injecting the at least one tone comprises injecting one of carrier wave tones, modulated tones, or a signal with a cyclostationary signature.

Example 27 includes the tester of any of Examples 18-26, wherein injected tones are modulated with one of on-off, phase or frequency modulation.

Example 28 includes a passive intermodulation tester comprising: a plurality of interfaces to communicatively couple the tester to a respective plurality of front-haul communication links used for communicating front-haul data to a respective plurality of remote radio heads (RRHs), each RRH having one or more antenna ports; a programmable processor, coupled to the plurality of interfaces, configured to execute software, wherein the software is operable to cause the tester to do the following: identify pairs of tones in a plurality of downlink bands for the plurality of remote radio heads, wherein potential PIM products may appear in one or more of a plurality of uplink bands in response to the identified pairs of tones; inject the identified pairs of tones in the plurality of downlink bands; and monitor the plurality of uplink bands for the potential PIM products from the injected pairs of tones.

Example 29 includes a program product for passive intermodulation testing, tangibly stored on a non-transitory storage medium, comprising instructions operable to cause at least one programmable processor to: identify pairs of tones in at least one downlink band for at least one cell, wherein potential PIM products may appear in at least one uplink band of the remote radio head in response to the identified tones; inject the identified pairs of tones in the at least one downlink band of the remote radio head; monitor the at least one uplink band for the potential PIM products from the injected pairs of tones; and record the existence of the potential PIM products when detected.

Example 30 includes the program product of Example 29, wherein identifying pairs of tones in the at least one downlink band includes: calculating the potential PIM products using the pairs of tones; and identifying a subset of the pairs of tones to be injected in the at least one downlink band to test for the potential PIM products in the at least one unlink band.

Example 31 includes the program product of Example 30, wherein identifying a subset of the pairs of tones includes selecting a pair of tones that produces a lower order PIM product when multiple pairs of tones produce PIM products for the same uplink band.

Example 32 includes the program product of any of Examples 30-31, wherein identifying pairs of tones comprises pairing each tone in a plurality of downlink bands with the other tones in the plurality of downlink bands and calculating potential PIM products based on each pair of tones.

Example 33 includes the program product of Example 32, wherein identifying pairs of tones further comprises determining whether the calculated, potential PIM products fall in any of the at least one uplink bands.

Example 34 includes the program product of any of Examples 29-33, wherein injecting the identified pairs of tones comprises injecting a first tone on one downlink band and a second tone on a second downlink band.

Example 35 includes a method of testing for passive intermodulation (PIM) for a base station, the method comprising: identifying at least one signal in at least one downlink band for the base station, wherein potential PIM products may appear in at least one uplink band of the base station in response to the at least one identified signal; injecting the at least one identified signal in the at least one downlink band of the base station; and monitoring the at least one uplink band for the potential PIM products from the injected at least one signal.

Example 36 includes a passive intermodulation tester, comprising: at least one interface to communicatively couple the tester unit to a front-haul communication link used for communicating front-haul, baseband data to a remote radio head (RRH) having one or more antenna ports; a programmable processor, coupled to the interface, configured to execute software, wherein the software is operable to cause the tester to do the following: inject at least one test signal in the baseband data of at least one downlink band of the remote radio head; monitor at least one uplink band for potential PIM products induced by the injected at least one test signal.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of testing for passive intermodulation (PIM) for a base station, the method comprising:
    detecting cell configuration data for at least one cell of the base station;
    prompting a user to identify at least one downlink band for at least one detected cell;
    identifying tones in the at least one downlink band for the at least one detected cell, wherein potential PIM products may appear in at least one uplink band of the base station in response to the identified tones;
    injecting the identified tones in the at least one downlink band of the base station;
    monitoring the at least one uplink band for the potential PIM products from the injected tones;
    recording the existence of the potential PIM products when detected; and
    wherein identifying tones comprises pairing each tone in a plurality of downlink bands with the other tones in the plurality of downlink bands and calculating potential PIM products based on each pair of tones.

2. The method of claim 1, wherein detecting cell configuration data comprises detecting a cell ID from baseband data transmitted on an optical link between a baseband unit (BBU) and a remote radio head (RRH).

3. The method of claim 2, wherein the baseband data is transmitted using one of a CPRI interface, an OBSAI interface, and an ORI interface.

4. The method of claim 1, wherein prompting the user to identify at least one downlink band comprises prompting the user for an RF channel number.

5. The method of claim 4, wherein prompting the user further comprises presenting a list of downlink bands associated with a detected cell ID.

6. The method of claim 1, wherein identifying tones in the at least one downlink band includes; and
    identifying a subset of the pairs of tones to be injected in the at least one downlink band to test for the potential PIM products in the uplink band.

7. The method of claim 6, wherein identifying a subset of pairs of tones includes identifying a pair of tones that produces a lowest order PIM product that falls within the uplink band.

8. The method of claim 1, wherein identifying tones comprises selecting pairs of tones in the same downlink band.

9. The method of claim 1, wherein identifying tones further comprises determining whether the calculated, potential PIM products fall in any of the at least one uplink bands of the base station.

10. The method of claim 1, wherein injecting the tones comprises injecting a first tone on one downlink band and a second tone on a second downlink band.

11. The method of claim 1, wherein monitoring the at least one uplink band for the potential PIM products comprises:
    tuning a narrowband receiver around a frequency of the potential PIM product;
    applying a Fast Fourier Transform (FFT) to the data from the narrowband receiver; and
    checking for a signal magnitude above a selected threshold.

12. The method of claim 11, and further including averaging the output of the FFT over time.

13. The method of claim 1, and further repeating the process of injecting the identified tones and monitoring the at least one uplink band a plurality of times before recording the existence of the potential PIM products.

14. The method of claim 1, wherein injecting the identified tones comprises injecting one of carrier wave tones, modulated tones, or a signal with a cyclostationary signature.

15. The method of claim1, wherein injected tones are modulated with one of on-off, phase or frequency modulation.

16. The method of claim 1, wherein monitoring the at least one uplink band for PIM products comprises monitoring an uplink channel that is paired with at least one of the at least one downlink band.

17. A passive intermodulation tester, comprising:
    at least one interface to communicatively couple the tester unit to a front-haul communication link used for communicating front-haul data to a remote radio head (RRH) having one or more antenna ports;
    a programmable processor, coupled to the interface, configured to execute software, wherein the software is operable to cause the tester to do the following:
    identify at least one tone in at least one downlink band of the remote radio head, wherein potential PIM products may appear in at least one uplink band of the remote radio head in response to the identified at least one tone;
    inject the identified at least one tone in the at least one downlink band of the remote radio head;
    monitor the at least one uplink band for the potential PIM products from the injected at least one tone;
    record the existence of the potential PIM products when detected; and
    wherein identifying at least one tone comprises pairing each tone in a plurality of downlink bands with the other tones in the plurality of downlink bands and calculating potential PIM products based on each pair of tones.

18. The tester of claim 17, wherein the at least one interface and programmable processor are implemented on a circuit board that is adapted for insertion into an RF test system.

19. The tester of claim 18, wherein the at least one interface is adapted to use optic equipment in the RF test system to communicate over the front-haul communication link.

20. The tester of claim 17, wherein identifying at least one tone comprises identifying pairs of tones in the at least one downlink band including:
    identifying a subset of the pairs of tones to be injected in the at least one downlink band to test for the potential PIM products in the at least one uplink band.

21. The tester of claim 20, wherein identifying a subset of the pairs of tones includes selecting a pair of tones that produces a lowest order PIM product for the uplink band.

22. The tester of claim 17, wherein identifying at least one tone further comprises determining whether the calculated, potential PIM products fall in any of the at least one uplink bands.

23. The tester of claim 17, wherein injecting the at least one tone comprises injecting a first tone on one downlink band and a second tone on a second downlink band.

24. The tester of claim 17, wherein injecting the at least one tone comprises injecting one of carrier wave tones, modulated tones, or a signal with a cyclostationary signature.

25. The tester of claim 17, wherein injected tones are modulated with one of on-off, phase or frequency modulation.

26. A program product for passive intermodulation testing, tangibly stored on a non-transitory storage medium, comprising instructions operable to cause at least one programmable processor to:
identify pairs of tones in at least one downlink band for at least one cell, wherein potential PIM products may appear in at least one uplink band of the remote radio head in response to the identified tones;
inject the identified pairs of tones in the at least one downlink band of the remote radio head;
monitor the at least one uplink band for the potential PIM products from the injected pairs of tones; and
record the existence of the potential PIM products when detected; and
wherein identifying pairs of tones in the at least one downlink band includes:
calculating the potential PIM products using the pairs of tones; and
identifying a subset of the pairs of tones to be injected in the at least one downlink band to test for the potential PIM products in the at least one uplink band.

27. The program product of claim 26, wherein identifying a subset of the pairs of tones includes selecting a pair of tones that produces a lower order PIM product when multiple pairs of tones produce PIM products for the same uplink band.

28. The program product of claim 26, wherein identifying pairs of tones comprises pairing each tone in a plurality of downlink bands with the other tones in the plurality of downlink bands and calculating potential PIM products based on each pair of tones.

29. The program product of claim 28, wherein identifying pairs of tones further comprises determining whether the calculated, potential PIM products fall in any of the at least one uplink bands.

30. The program product of claim 26, wherein injecting the identified pairs of tones comprises injecting a first tone on one downlink band and a second tone on a second downlink band.

31. A method of testing for passive intermodulation (PIM) for a base station, the method comprising:
detecting cell configuration data for at least one cell of the base station;
prompting a user to identify at least one downlink band for at least one detected cell;
identifying tones in the at least one downlink band for the at least one detected cell, wherein potential PIM products may appear in at least one uplink band of the base station in response to the identified tones;
injecting the identified tones in the at least one downlink band of the base station;
monitoring the at least one uplink band for the potential PIM products from the injected tones;
recording the existence of the potential PIM products when detected;
wherein identifying tones in the at least one downlink band includes:
calculating the potential PIM products using a plurality of pairs of tones in the at least one downlink band identified by the user; and
identifying a subset of the pairs of tones to be injected in the at least one downlink band to test for the potential PIM products in the uplink band.

32. A method of testing for passive intermodulation (PIM) for a base station, the method comprising:
detecting cell configuration data for at least one cell of the base station;
prompting a user to identify at least one downlink band for at least one detected cell;
identifying tones in the at least one downlink band for the at least one detected cell, wherein potential PIM products may appear in at least one uplink band of the base station in response to the identified tones;
injecting the identified tones in the at least one downlink band of the base station;
monitoring the at least one uplink band for the potential PIM products from the injected tones;
recording the existence of the potential PIM products when detected;
wherein monitoring the at least one uplink band for the potential PIM products comprises:
tuning a narrowband receiver around a frequency of the potential PIM product;
applying a Fast Fourier Transform (FFT) to the data from the narrowband receiver; and
checking for a signal magnitude above a selected threshold.

33. A passive intermodulation tester, comprising:
at least one interface to communicatively couple the tester unit to a front-haul communication link used for communicating front-haul data to a remote radio head (RRH) having one or more antenna ports;
a programmable processor, coupled to the interface, configured to execute software, wherein the software is operable to cause the tester to do the following:
identify at least one tone in at least one downlink band of the remote radio head, wherein potential PIM products may appear in at least one uplink band of the remote radio head in response to the identified at least one tone;
inject the identified at least one tone in the at least one downlink band of the remote radio head;
monitor the at least one uplink band for the potential PIM products from the injected at least one tone;
record the existence of the potential PIM products when detected;
wherein identifying at least one tone comprises identifying pairs of tones in the at least one downlink band including:
calculating the potential PIM products using the pairs of tones; and
identifying a subset of the pairs of tones to be injected in the at least one downlink band to test for the potential PIM products in the at least one uplink band.

* * * * *